(12) United States Patent
Roy et al.

(10) Patent No.: US 12,175,283 B2
(45) Date of Patent: Dec. 24, 2024

(54) HARDWARE-ACCELERATED COMPUTING SYSTEM

(71) Applicant: NXP USA, Inc., Austin, TX (US)

(72) Inventors: Sourav Roy, Kolkata (IN); Arvind Kaushik, Noida (IN); Sneha Mishra, Gurgaon (IN); Joseph Gergen, Manchaca, TX (US)

(73) Assignee: NXP USA, Inc., Austin, TX (US)

( * ) Notice: Subject to any disclaimer, the term of this patent is extended or adjusted under 35 U.S.C. 154(b) by 788 days.

(21) Appl. No.: 17/303,131

(22) Filed: May 20, 2021

(65) Prior Publication Data

US 2021/0382748 A1 Dec. 9, 2021

(30) Foreign Application Priority Data

Jun. 9, 2020 (EP) .................................... 20179063

(51) Int. Cl.
*G06F 9/455* (2018.01)
*G06F 9/48* (2006.01)

(52) U.S. Cl.
CPC ............ *G06F 9/485* (2013.01); *G06F 9/4881* (2013.01)

(58) Field of Classification Search
CPC .... G06F 9/45558; G06F 9/485; G06F 9/4881; G06F 9/4843; G06F 9/4856; G06F 11/0721; G06F 13/36
USPC ........................................ 718/100, 102, 108
See application file for complete search history.

(56) References Cited

U.S. PATENT DOCUMENTS

| | | | |
|---|---|---|---|
| 7,062,767 B1 * | 6/2006 | McCarthy | G06F 13/36 712/225 |
| 8,949,838 B2 | 2/2015 | Mital et al. | |
| 9,703,603 B1 | 7/2017 | Roy et al. | |
| 11,422,856 B2 * | 8/2022 | Li | G06F 9/463 |
| 2003/0014484 A1 * | 1/2003 | Netzer | G06F 9/4843 709/203 |
| 2005/0149937 A1 * | 7/2005 | Pilkington | G06F 9/526 718/102 |
| 2009/0216958 A1 | 8/2009 | Biles et al. | |

(Continued)

OTHER PUBLICATIONS

Linux Tutorial: POSIX Threads—Website: https://www.cs.cmu.edu/afs/cs/academic/class/15492-f07/www/pthreads.html, pp. 1-13.

*Primary Examiner* — Mehran Kamran

(57) ABSTRACT

In a hardware-accelerated computing systems, calls are made from a processor to an accelerator core. The hardware-accelerated computing system includes a processor core having a stack, an accelerator, and an accelerator scheduler. The computing system is configured to process an accelerator command by the processor core issuing an accelerator command to the accelerator scheduler during execution of a task the accelerator scheduler receiving the accelerator command and requesting data from the stack, the processor sending the requested data from the stack to the accelerator scheduler, the accelerator scheduler sending the requested data to the accelerator and sending a write response to the processor, the accelerator processing the accelerator command, and the processor continuing execution of the task. The processor pauses execution of the task upon issuing the accelerator command and resumes execution of the task upon receiving the write response from the accelerator scheduler.

15 Claims, 2 Drawing Sheets

(56) References Cited

U.S. PATENT DOCUMENTS

| | | | |
|---|---|---|---|
| 2015/0234679 A1* | 8/2015 | Moyer | G06F 9/4856 718/108 |
| 2016/0103736 A1* | 4/2016 | Bose | G06F 11/0721 714/764 |
| 2019/0187930 A1* | 6/2019 | Chinnakkonda Vidyapoornachary | G11C 5/06 |

* cited by examiner

HARDWARE-ACCELERATED COMPUTING SYSTEM

CROSS-REFERENCE TO RELATED APPLICATIONS

This application claims the priority under 35 U.S.C. § 119 of European Patent application no. 20179063.1, filed on 9 Jun. 2020, the contents of which are incorporated by reference herein.

FIELD

The disclosure relates to hardware-accelerated computing systems in which calls are made from a processor to an accelerator core.

BACKGROUND

FIG. 1 illustrates schematically an example hardware-accelerated computing system 100. The system 100 includes a processor 101, a register context memory 102, an accelerator scheduler 103, a data bus 104, first and second accelerator cores 105, 106 and a stack memory 107. The processor 101 includes a register 108. The processor 101 and/or computer system 100 may be provided on one or more integrated circuits. Further details of the example computer system 100 are disclosed in U.S. Pat. No. 9,703,603 B1.

The processor 101 executes program tasks, which may include accelerator call functions. The processor 101 switches between multiple program tasks by switching between corresponding task context information, stored in the register 108. The register 108 further stores a command descriptor that indicates the accelerator operation to be performed by the accelerator cores 105, 106. The register context memory 102 is connected to the register 108 to receive and store the task context information during context switching.

The accelerator scheduler 103 is connected to the processor 101 to receive the command descriptor. The accelerator scheduler 103 identifies one of the accelerator cores 105, 106 and forwards the command descriptor to the identified accelerator core via the data bus 104. Subsequently, the identified accelerator core performs the accelerator operation assigned by the processor 101.

The stack memory 107 is connected to the processor 101 to store additional function arguments when the accelerator call function includes a number of function arguments that exceed the number of registers. Data structures on the stack 107 may also be passed to the accelerator as function arguments by reference or pointers. The processor 101 receives the function arguments from the stack memory 107 and transfers them to one of the first and second accelerator cores 105, 106.

In operation, the processor 101 executes a first program task that includes an accelerator call function, which triggers transfer of the command descriptor to one of the first and second accelerator cores 105, 106. When the processor 101 executes the accelerator call function, the processor 101 stores the command descriptor of the accelerator call function in the register 108. The processor 101 executes the accelerator call instruction by transferring the command descriptor and the accelerator ID to the accelerator scheduler 103.

Concurrently, the processor 101 transfers the task context information of the first program task to the register context memory 102. The accelerator scheduler 103 identifies one of the accelerator cores 105, 106 and provides the command descriptor via the data bus 104. The accelerator operation is then executed and a return value generated corresponding to the accelerator operation, which is stored in the register context memory 102 by way of the data bus 104. The register context memory 102 provides the return value along with the task context information of the first program task to the processor 101. The processor 101 resumes execution of the first program task when it receives the return value and the task context information of the first program task.

When the number of function arguments, corresponding to the command descriptor, exceeds the number of registers, the additional function arguments are stored in the stack memory 107. The command descriptor of an accelerator call function includes function arguments and operands along with a stack pointer, which points to a memory location in the stack memory 107. Further, when an first accelerator core 105 receives the command descriptor, the accelerator core 105 requests the processor 101 to fetch the additional function arguments from the stack memory 107. The processor 101 fetches and provides the additional function arguments from the stack memory 107 to the accelerator core 105. Subsequently, the accelerator core 105 executes the accelerator operation and stores a corresponding return value in the register context memory 102.

The processor 101 cannot continue execution of the first program task without execution of the accelerator call function completing. Thus, the processor 101 is idle after the task context information of the first program task is transferred to the register context memory 102. The processor 101 can therefore fetch task context information of a second program task from the register context memory 102 and execute the second program task so that the processor 101 is not idle.

To reduce latency in accessing accelerator function variables, the stack 107 may be maintained in the processor's local memory. For speed of access, this memory may be in the form of SRAM, and may be limited in size. In some scenarios the system 100 may be left vulnerable to entries in the stack 107 being overwritten in error.

With each command, function arguments are stored in the stack 107 that the accelerator scheduler 103 associates with each task. As indicated above, execution may then continue, and similar commands may be issued by the processor 101 at a later stage. This may cause a second function relating to the same task to overwrite an entry in the stack 107 for a first function after the accelerator call has been made. This can lead to a race condition where data of a current command on the stack 107 may become corrupted by data of a subsequent command, resulting in functional failure if the data has not already been read by the scheduler 103. This poses a challenge to synchronising execution of parallel hardware threads by a processor using acceleration calls.

SUMMARY

According to a first aspect there is provided a hardware accelerated computing system comprising:
  a processor core comprising a stack;
  an accelerator; and
  an accelerator scheduler,
    wherein the computing system is configured to process an accelerator command by:
    the processor core issuing an accelerator command to the accelerator scheduler during execution of a task;

the accelerator scheduler receiving the accelerator command and requesting data from the stack;

the processor sending the requested data from the stack to the accelerator scheduler;

the accelerator scheduler sending the requested data to the accelerator and sending a write response to the processor;

the accelerator processing the accelerator command; and the processor continuing execution of the task, wherein the processor pauses execution of the task upon issuing the accelerator command and resumes execution of the task upon receiving the write response from the accelerator scheduler.

An advantage of the hardware accelerated computing system is that a stack overrun can be avoided without the need for the processor to issue a blocking command by ensuring that all data stored on the stack is read by an accelerator before the processor resumes execution. A stack overrun can thereby be avoided even in the case of a non-blocking command because data stored on the stack is read by the accelerator before the processor resumes execution.

The stack may be in the form of SRAM in the processor core.

The accelerator scheduler may be configured to send the write response only after all data for the accelerator command is read by the accelerator.

The computing system may further comprise an interconnect configured to communicate data between the processor core and the accelerator scheduler.

The interconnect may comprise a first interconnect configured to communicate data between the stack and the accelerator scheduler, and a second interconnect configured to communicate data between a store buffer in the processor core and the accelerator scheduler.

According to a second aspect there is provided a method of operating a hardware accelerated computing system comprising a processor core, a stack, an accelerator and an accelerator scheduler, the method comprising:

the processor core issuing an accelerator command to the accelerator scheduler during execution of a task;

the accelerator scheduler receiving the accelerator command and requesting data from the stack;

the processor sending the requested data from the stack to the accelerator scheduler;

the accelerator scheduler sending the requested data to the accelerator and sending a write response to the processor;

the accelerator processing the accelerator command; and the processor continuing execution of the task, wherein the processor pauses execution of the task upon issuing the accelerator command and resumes execution of the task upon receiving the write response from the accelerator scheduler.

The stack may be in the form of SRAM in the processor core.

The accelerator scheduler may send the write response only after all data for the accelerator command is read by the accelerator.

An interconnect may communicate data between the processor core and the accelerator scheduler.

The interconnect may comprise a first interconnect configured to communicate data between the stack and the accelerator scheduler, and a second interconnect configured to communicate data between a store buffer in the processor core and the accelerator scheduler.

In accordance with a third aspect there is provided a computer program for causing a hardware accelerated computing system to perform the method according to the second aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
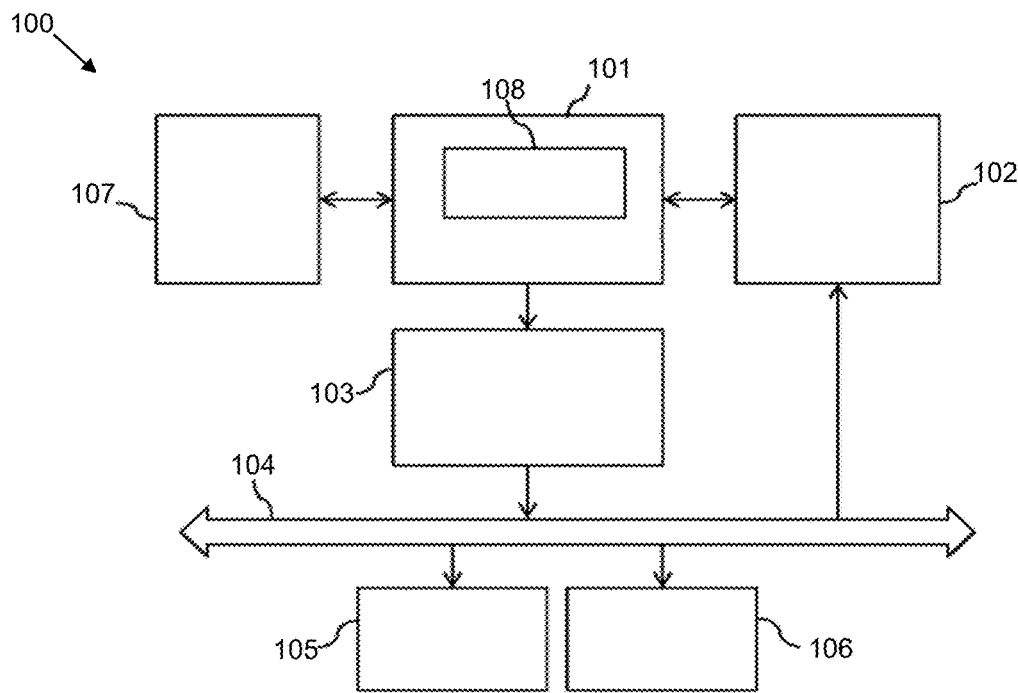
FIG. 1 is a schematic diagram of an example hardware-accelerated computer system.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 has been described in the background section above and shows an example computer system 100 employing a known method of handling accelerator calls to accelerator cores 105, 106 from a processor 101.

A call stack such as stack 107 is a data structure that stores information about the active subroutines of a computer program in order of execution in the form of a plurality of stack frames. The stack frame at the top of the stack is for the currently executing routine. Each stack frame will typically include at least the following items (in push order):

the arguments (or parameter values) passed to the routine (if any);

the return address back to the routine's caller; and space for the local variables of the routine (if any).

A hardware accelerated computing system typically comprises a processor core 101, accelerators 105, 106, interconnect 104, shared memory 102 and an accelerator management block 103 for managing tasks associated with each accelerator 105, 106.

When the processor 101 issues an accelerator call during execution of a task, this may be marked as either blocking or non-blocking. A blocking call will cause the processor 101 to wait until a result is returned from the accelerator core, while a non-blocking call will allow the processor 101 to continue execution after issuing the acceleration command. The way non-blocking calls may be implemented can pose a challenge with synchronising execution of parallel hardware threads, as outlined above. A blocking call prevents stack corruption but prevents the processor for carrying out further execution of further functions within a task while the accelerator call is pending.

Each function call manipulates local data and passes the reference to a leaf-level accelerator command function. The leaf level functions, i.e. functions that are at the end of a call tree and which do not themselves make any calls, tend to be vendor specific and have fixed arguments. They are usually numerous in order to abstract accelerator hardware details from a customer for simplified usage. As a result, functions customized over leaf-level APIs tend to have multiple local variables within the scope of each function definition.

For higher stack efficiency, variables within functions need to be kept local because there will be a large overhead if numerous arguments are passed from a global pool to every accelerator call as described in the simple coding example shown below.

```
main ( ) {
int d0,d1,d2...••dn;      //global variable pool
func A (d0,d1,d2...•,dn){
    •
    •
        funcB(d0,d1,d2...,dn) {
        •
        •
            func C(d0,d1,d2...,dn) {
            •
            •
            •
                accel_call    (d0,d1,d2...••dn)    //
Leaf-level accel function call
            }
        }
}
```

In the above example, func A( ) takes all variable from the global pool and pushes in the stack when func B( ) is called. The same variables are copied and pushed again in the stack when next function is called. This goes on until the leaf-level acceleration function is called. This adds redundancy and decreases stack efficiency, while also increasing the memory requirement allocated for the stack.

For leveraging faster hardware acceleration, latencies involved in accessing function variables need to be at a minimum. Hence, stack memory is preferably placed in the processor core local memory in the form of SRAM.

As mentioned above, how decisions are made at both the software level (a higher number of local variables within each function call) and the hardware level (stack placement) calls for optimization and higher performance in a hardware accelerated computing system. There consequently arises a challenge in the entire system architecture, which prevents parallel execution of hardware threads via non-blocking commands.

Figure 2:
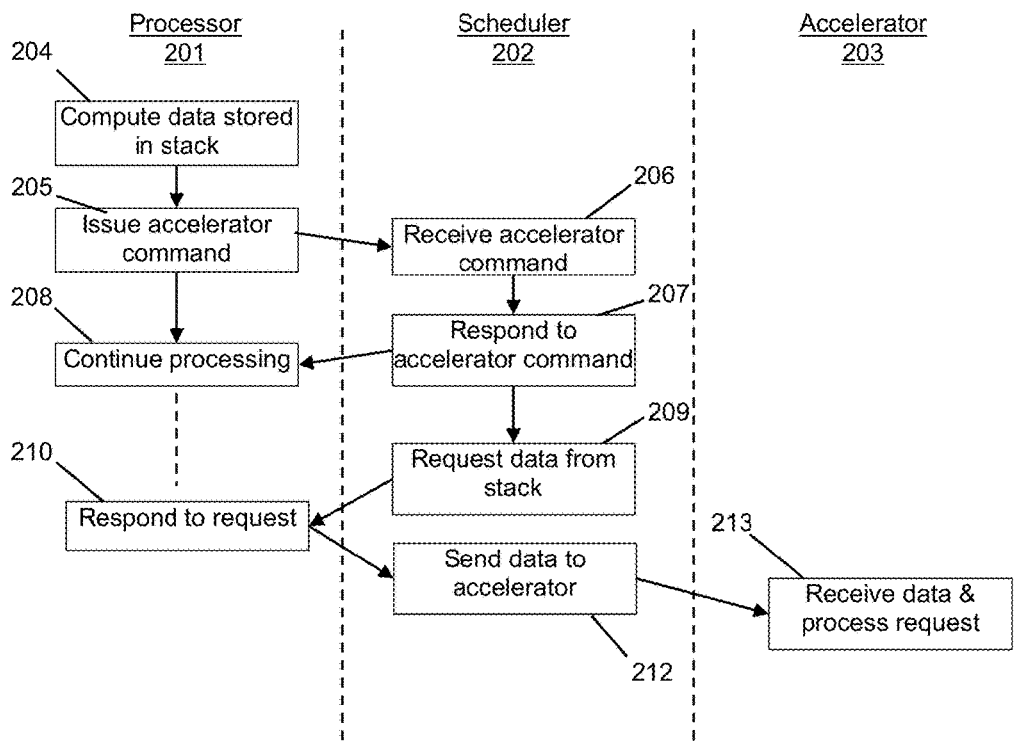
FIG. 2 is a diagram illustrating a sequence of steps in a hardware-accelerated computing system.

FIG. 2 illustrates an example process involving an accelerator call to an accelerator 203 made by a processor 201, which is managed by an accelerator scheduler 202 (also known as an accelerator thread management block, or ATMB). With a first accelerator call, relevant data is pushed onto the stack (step 204) and a request is scheduled with the accelerator scheduler 202 (step 205). The scheduler receives the accelerator command (step 206) and responds to the command (step 207) by sending an acknowledgment back to the processor 201 (step 207). The processor 201 can then continue processing other functions in the same task (step 208) while the accelerator call continues. The scheduler 202 then requests data from the stack (step 209) relating to the accelerator command, which the processor 201 responds to (step 210) by retrieving data from memory. The scheduler 202 then sends the data to the accelerator 203 (step 212). Finally, at step 213, the accelerator 203 receives the data and processes the request.

As can be seen in FIG. 2, between steps 208 and 210 there is a window in between the time data is pushed and the time when ATMB reads the data relevant to that command. If software execution continues and another command is issued within that window, the stack area may be overwritten and the data required for the first acceleration lost. As a result, execution of parallel hardware threads cannot reliably be exercised via this type of process.

To solve the above problem, a new memory barrier may be implemented in the processor, which is enforced by the scheduler. This involves a non-blocking command being issued by the processor, which is implemented in hardware as a store instruction. A barrier instruction is placed immediately after issuing a store instruction to a non-blocking command portal space. As opposed to normal barrier behaviour of blocking execution by the processor until stores are flushed, implementation of the memory barrier causes the processor to only temporarily halt execution until the store buffer is flushed out, including the non-blocking accelerator command. The scheduler delays a write response to the processor until the entire data for consumption by the accelerator is read. Although this adds delay in software execution, the delay is small compared to that involved in issuing a blocking accelerator command.

Figure 3:
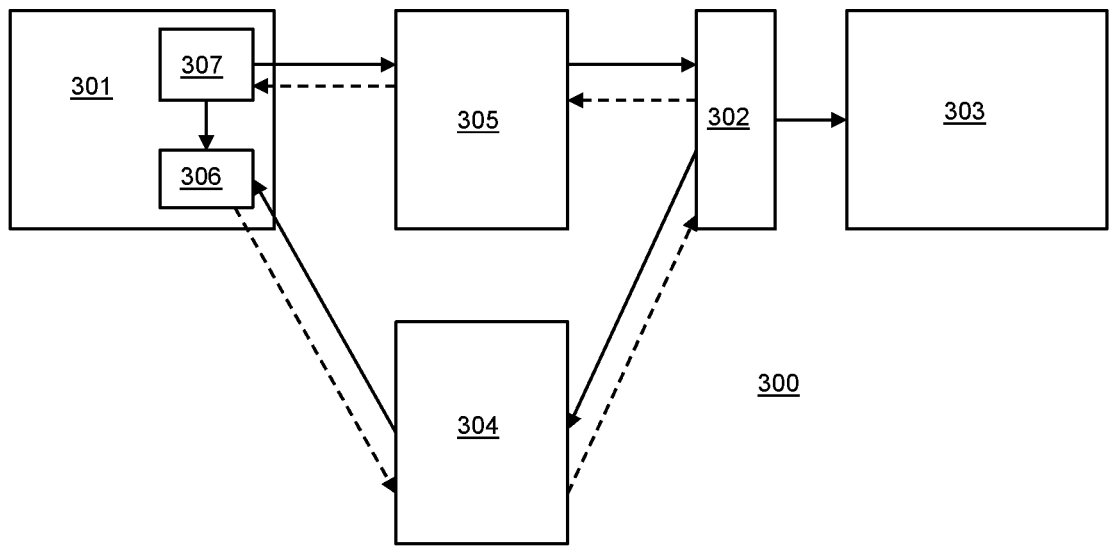
FIG. 3 is a schematic diagram of an example arrangement of a hardware accelerated computing system.
Figure 4:
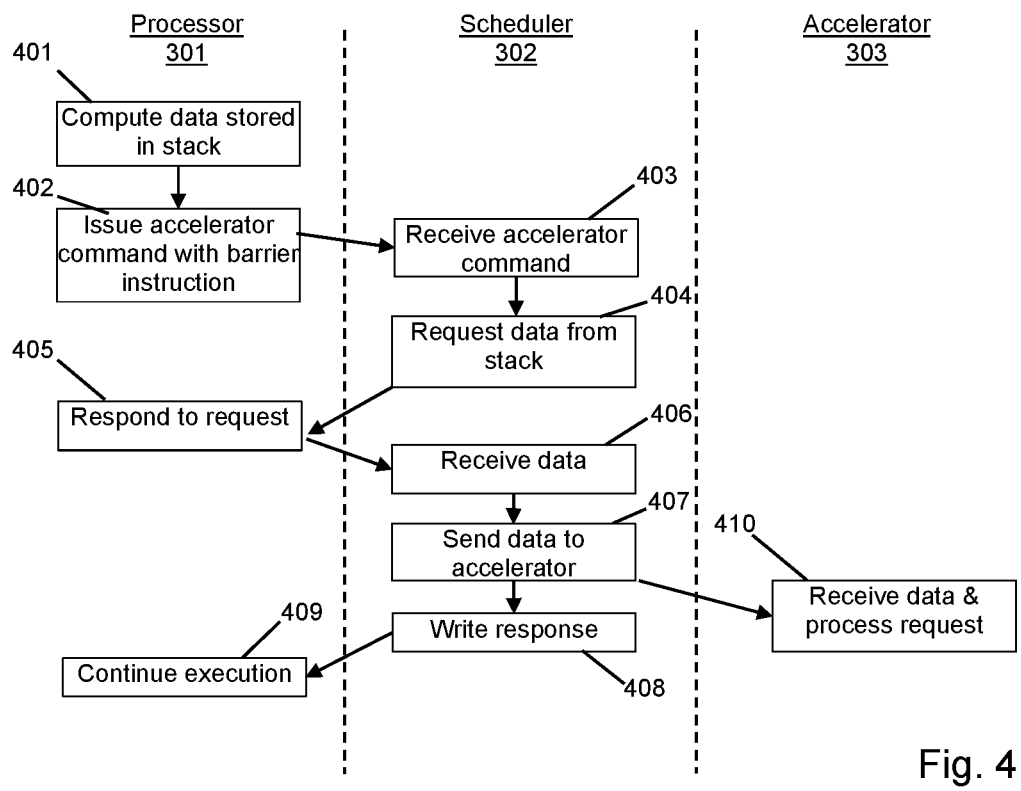
FIG. 4 is a diagram illustrating an example sequence of steps in the hardware accelerated computing system of FIG. 3.

FIG. 3 is a schematic diagram illustrating a hardware accelerated computing system 300, comprising a processor core 301, an accelerator 303, first and second interconnects 304, 305 and an accelerator scheduler or ATMB 302. The first interconnect 304 connects the RAM 306 in the processor core 301 with the accelerator scheduler 302, while the second interconnect connects the store buffer 307 with the accelerator scheduler 302. The processor core 301 comprises RAM 306 (e.g. WS RAM) and a store buffer 307. FIG. 4 illustrates a series of steps involving an accelerator command being issued and processed. In step 401 the data computed by software is stored in the stack (which in this case is the RAM 306). In step 402, an accelerator command is issued by the processor 301. The accelerator command is accompanied by a barrier instruction, which halts execution by the processor 301 and causes the processor 301 to wait for a write response from the accelerator core interconnect 304. After receiving the accelerator command (step 403), the ATMB 302 generates a request to obtain data from the stack (step 404). The processor 301 then responds to the request (step 405) with the required data. As soon as the data is read from the stack (step 406), the ATMB 302 directs the accelerator to proceed (step 406) by sending the data to the accelerator (step 407) and sends a write response back to the processor (step 408), which can then continue execution (step 409) while the accelerator processes the request (step 410).

The proposed solution restructures the steps in data generation and procurement via implementing a barrier between the processor and accelerator, which maintains data consistency with respect to accelerator commands, at the expense of only a small delay between issuing an accelerator command and receiving a confirmation from the scheduler.

The solution described herein may be implemented in a range of hardware accelerated computing systems and may for example find use in applications such as WiFi (IEEE 802.11x) and advanced driver-assisted systems (ADAS).

From reading the present disclosure, other variations and modifications will be apparent to the skilled person. Such variations and modifications may involve equivalent and other features which are already known in the art of memory systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A hardware-accelerated computing system comprising:
a processor core comprising a stack;
an accelerator; and
an accelerator scheduler,
wherein the computing system is configured to process an accelerator command by:
the processor core issuing the accelerator command to the accelerator scheduler during execution of a task, wherein the processor core issues the accelerator command with a barrier instruction which follows the accelerator command, wherein the barrier instruction causes the processor core to halt software execution until a write response is received from the accelerator scheduler;
the accelerator scheduler receiving the accelerator command and requesting data from the stack;
the processor core sending the requested data from the stack to the accelerator scheduler;
the accelerator scheduler sending the requested data to the accelerator and sending the write response to the processor core; and
the processor core resuming software execution, including execution of the task, in response to receiving the write response from the accelerator scheduler, wherein the processor core resumes software execution while the accelerator processes the accelerator command.

2. The computing system of claim 1, wherein the stack is in the form of SRAM in the processor core.

3. The computing system of claim 1, wherein the accelerator scheduler is configured to send the write response only after all data for the accelerator command is read by the accelerator.

4. The computing system of claim 1, comprising an interconnect configured to communicate data between the processor core and the accelerator scheduler.

5. The computing system of claim 4, wherein the interconnect comprises a first interconnect configured to communicate data between the stack and the accelerator scheduler and a second interconnect configured to communicate data between a store buffer in the processor core and the accelerator scheduler.

6. A method of operating a hardware accelerated computing system comprising a processor core, a stack, an accelerator and an accelerator scheduler, the method comprising:
the processor core issuing an accelerator command to the accelerator scheduler during execution of a task, wherein the processor core issues the accelerator command with a barrier instruction which follows the accelerator command, wherein the barrier instruction causes the processor core to halt software execution until a write response is received from the accelerator scheduler;
the accelerator scheduler receiving the accelerator command and requesting data from the stack;
the processor core sending the requested data from the stack the accelerator scheduler;
the accelerator scheduler sending the requested data to the accelerator and sending the write response to the processor core; and
the processor core resuming software execution, including execution of the task, in response to receiving the write response from the accelerator scheduler, wherein the processor core resumes software execution while the accelerator processes the accelerator command.

7. The method of claim 6, wherein the stack is in the form of SRAM in the processor core.

8. The method of claim 6, wherein the accelerator scheduler sends the write response only after all data for the accelerator command is read by the accelerator.

9. The method of claim 6, wherein an interconnect communicates data between the processor core and the accelerator scheduler.

10. The method of claim 9, wherein the interconnect comprises a first interconnect configured to communicate data between the stack and the accelerator scheduler and a second interconnect configured to communicate data between a store buffer in the processor core and the accelerator scheduler.

11. A non-transitory computer-readable medium that includes a computer program for causing a hardware accelerated computing system comprising a processor core, a stack, an accelerator and an accelerator scheduler to perform a method comprising:
the processor core issuing an accelerator command to the accelerator scheduler during execution of a task, wherein the processor core issues the accelerator command with a barrier instruction which follows the accelerator command, wherein the barrier instruction causes the processor core to halt software execution until a write response is received from the accelerator scheduler;
the accelerator scheduler receiving the accelerator command and requesting data from the stack;
the processor core sending the requested data from the stack to the accelerator scheduler;

the accelerator scheduler sending the requested data to the accelerator and sending the write response to the processor core; and the processor core resuming software execution, including execution of the task, in response to receiving the write response from the accelerator scheduler, wherein the processor core resumes software execution while the accelerator processes the accelerator command.

12. The non-transitory computer-readable medium of claim 11, wherein, in the method, the accelerator scheduler sends the write response only after all data for the accelerator command is read by the accelerator.

13. The computing system of claim 1, wherein the accelerator command issued by the processor core is implemented as a store instruction, and the barrier instruction is placed immediately after the store instruction.

14. The method of claim 6, wherein the accelerator command issued by the processor core is implemented as a store instruction, and the barrier instruction is placed immediately after the store instruction.

15. The non-transitory computer-readable medium of claim 11, wherein, in the method, the accelerator command issued by the processor core is implemented as a store instruction, and the barrier instruction is placed immediately after the store instruction.

* * * * *